United States Patent [19]

Hasegawa et al.

[11] Patent Number: 4,701,900
[45] Date of Patent: Oct. 20, 1987

[54] DISC PLAYERS FITTED FOR AUTOMATIC CHANGE OF DISCS

[75] Inventors: Norio Hasegawa, Chiba; Toyomi Fujino; Susumu Matsubara, both of Kanagawa, Japan

[73] Assignee: Sony Corporation, Tokyo, Japan

[21] Appl. No.: 739,435

[22] Filed: May 30, 1985

[30] Foreign Application Priority Data

May 31, 1984 [JP] Japan .................................. 59-111788

[51] Int. Cl.⁴ ...................... G11B 5/012; G11B 17/04; G11B 17/26
[52] U.S. Cl. ......................................... 369/36; 369/38; 369/39; 369/194
[58] Field of Search ...................... 369/194, 34, 36, 37, 369/38, 39

[56] References Cited

U.S. PATENT DOCUMENTS

2,644,565 7/1953 Ebert .................................... 369/194
4,170,030 10/1979 Castrodale et al. .................... 369/38
4,481,618 11/1984 Nakayama ............................ 369/194

*Primary Examiner*—Steven L. Stephan
*Attorney, Agent, or Firm*—Hill, Van Santen, Steadman & Simpson

[57] ABSTRACT

A disc player fitted for automatic change of discs comprises a disc pack receiving table for receiving and holding a disc pack containing a plurality of discs, a disc rotating device for rotating a disc taken out from the disc pack and loaded thereon, and a movable chassis operative to move up and down in relation to the disc pack receiving table and provided with a mechanical arrangement comprising a sliding lever for actuating a sliding member provided in the disc pack to take a selected disc out of the disc pack, a motor for rotating selectively in the clockwise and counterclockwise directions, a driving roller for being rotated with the rotatory driving force produced by the motor to carry the selected disc taken out from the disc pack to the disc rotating device, and a driving mechanism actuated with the rotatory driving force produced by the motor for driving the sliding lever in the manner for taking a disc out of the disc pack when the motor rotates in one of the clockwise and counterclockwise directions and for driving the sliding lever to put back the same when the motor rotates in the other of the clockwise and counterclockwise directions.

8 Claims, 13 Drawing Figures

DISC PLAYERS FITTED FOR AUTOMATIC CHANGE OF DISCS

BACKGROUND OF THE INVENTION

1. Field of the Invention

The present invention relates generally to disc players fitted for automatic change of discs, and more particularly, to a disc player equipped with a disc changing mechanism working with a disc pack, which contains a plurality of discs used for reproduction of information signals and is attached to the disc changing mechanism, for loading automatically a selected one of the discs contained in the disc pack on a disc rotating device to put the same in a playing state and for removing automatically a disc from the disc rotating device to put the same back in the disc pack.

2. Description of the Prior Art

There has been proposed a disc player fitted for automatic change of discs, which is equipped with a disc changing mechanism working with a disc pack containing a plurality of discs used for reproduction of information signals and being attached thereto for loading automatically and selectively the discs contained in the disc pack on a disc rotating device which is provided therein for putting a disc in a playing state.

In such a disc player equipped with the disc changing mechanism to which the disc pack is attached, when a disc loading operation for putting a selected one of the discs stacked to be contained in the disc pack on the disc rotating device or a disc unloading operation for removing a disc from the disc rotating device to put the same back in the disc pack is carried out, a disc carrier in the disc changing mechanism, which comprises means for taking a disc out of the disc pack, means for removing a disc from the disc rotating device, a driving roller for carrying a disc from the disc pack to the disc rotating device or vice versa and so no, is moved up and down in its entirety in relation to the disc pack at the location facing to an opening provided on the disc pack for insertion or delivery of discs. This movement of the disc carrier is conducted to detect a desired disc receiving compartment in the disc pack in which a disc selected to be taken out is placed or to detect a predetermined disc receiving compartment in the disc pack in which a disc removed from the disc rotating device is to be put back.

In general, for the disc loading operation in the disc player equipped with a disc changing mechanism as mentioned above, it is required to take a selected disc out of the disc pack and then to carry the disc taken out toward the disc rotating device. In this connection, it would be thought out to make the disc pack have a sliding member for sending each disc out thereof and make the disc changing mechanism have a sliding lever for driving the sliding member in the disc pack, so that the sliding lever is moved to be placed at a position of the sliding member corresponding to the selected disc by the carrier moving up and down then the sliding lever is driven by a motor which is controlled by an electronic controller, and further to make the disc carrier have a driving roller for carrying promptly the disc taken out of the disc pack by the sliding lever to the disc rotating device, so as to be driven by an additional motor which is also controlled by the electronic controller.

Moreover, in the disc player equipped with the disc changing mechanism having the disc carrier operative to move up and down in relation to the disc pack as aforementioned, if the disc pack is ejected from the disc changing mechanism during the disc loading operation, disc unloading operation or information signal reproducing operation, there is caused a problem that a disc which is in process of being taken out of the disc pack or being inserted in the disc pack is wounded or a disc having been taken out of the disc pack can not be put back in the disc pack. Further, if a disc inserted in the disc pack is not placed in its proper position in the disc pack to project partially from the disc pack, the disc carrier moving up and down in relation to the disc pack is likely to run into the disc partially projecting from the disc pack to wound the same.

Accordingly, for avoiding these problems or troubles, it would be also thought out to make the disc changing mechanism have a locking member for locking the disc pack thereon to be driven by a motor which is controlled by an electronic controller, so that the disc pack is prevented from being ejected with the motor held in its inoperative state during the disc loading operation, disc unloading operation and information signal reproducing operation, and further to make the disc pack have a disc setting member for moving a disc inserted therein to its proper position in the disc pack and make the disc changing mechanism have a driving lever for actuating the setting member in the disc pack to be driven by an additional motor which is controlled by the electronic controller, so that the disc inserted in the disc pack is guided to its proper position in the disc pack through the disc setting member with the additional motor rotated in a proper manner.

However, in the case where each of the sliding lever and the driving roller provided in the disc changing mechanism is driven by the individual motor as described above, a couple of motors and a couple of control systems for controlling the motors, respectively, are required. Similarly, in the case where each of the locking member and the driving lever provided in the disc changing mechanism is driven by the individual motor as also described above, another couple of motors and another couple of control systems for controlling the motors, respectively, are required. These facts result in disadvantages that the disc changing mechanism comes to be complicated in configuration, the cost of the disc player is increased and the disc player is hindered from being miniaturized in size and lightened in weight.

OBJECTS AND SUMMARY OF THE INVENTION

Accordingly, it is an object of the present invention to provide a disc player fitted for automatic change of discs, which avoids the foregoing problems and disadvantages encountered with the prior art.

Another object of the present invention is to provide a disc player fitted for automatic change of discs, which is equipped with a disc changing mechanism working with a disc pack which contains a plurality of discs and being capable of taking surely one of the discs out of the disc pack and of loading expeditiously the disc taken out from the disc pack on a disc rotating device to put the same in a playing state with a relatively simplified configuration.

A further object of the present invention is to provide a disc player fitted for automatic change of discs, which is equipped with a disc changing mechanism working with a disc pack which contains a plurality of discs and has a sliding member for sending out a disc from the disc pack and being capable of taking one of the discs out of the disc pack and of loading the disc taken out from the disc pack on a disc rotating device to put the same in a playing state, with a relatively simplified configuration in which a sliding lever for actuating the sliding member in the disc pack and a driving roller for carrying the disc taken out from the disc pack to the disc rotating device are driven by a common single motor.

A still further object of the present invention is to provide a disc player fitted for automatic change of discs, which is equipped with a disc changing mechanism working with a disc pack which contains a plurality of discs and has a disc setting member for moving a disc inserted in the disc pack to a proper position therein and being capable of preventing the disc pack from being ejected therefrom during a disc loading operation, disc unloading operation and information signal reproducing operation and of causing each disc inserted in the disc pack to take the individual proper position therein, with a relatively simplified configuration in which a locking member for locking the disc pack on the disc changing mechanism and a driving lever for actuating the disc setting member in the disc pack are driven by a common single motor.

According to an aspect of the present invention, there is provided a disc player fitted for automatic change of discs, which comprises a disc pack receiving table for receiving and holding a disc pack containing a plurality of discs and having a sliding member for sending out a disc from the disc pack and a disc setting member for moving a disc inserted in the disc pack to a proper position therein, a disc rotating device for rotating a disc taken out from the disc pack and loaded thereon, and a movable chassis operative to move up and down in relation to the disc pack receiving table and provided thereon with a sliding lever for actuating the sliding member to take a selected disc out of the disc pack, a driving motor for rotating selectively in the clockwise and counterclockwise directions, a driving roller for being rotated with the rotatory driving force produced by the driving motor to carry the selected disc taken out from the disc pack to the disc rotating device, a gear moving arm for being rotated with the rotatory driving force produced by the driving motor in one of first and second directions in accordance with the rotational direction of the driving motor, a driving gear supported by the gear moving arm to be rotated with the rotatory driving force produced by the driving motor, and a gear with teeth lacking partially for engaging with the driving gear to be rotated by a first predetermined rotatory angle in one direction to drive the sliding lever in the manner for taking a disc out of the disc pack when the gear moving arm is rotated in the first direction and also engaging with the driving gear to be rotated by a second predetermined rotatory angle in the other direction to drive the sliding lever so as to put back the same when the gear moving arm is rotated in the second direction.

In an embodiment of disc player according to the present invention, the disc pack receiving table is provided with a locking member for locking the disc pack on the disc pack receiving table, a driving lever for actuating the disc setting member in the disc pack, an additional motor for rotating selectively in the clockwise and counterclockwise directions, an additional gear moving arm for being rotated with the rotatory driving force produced by the additional motor in one of third and fourth directions in accordance with the rotational direction of the additional motor, an additional driving gear supported by the additional gear moving arm to be rotated with the rotatory driving force produced by the additional motor, a first follower gear for engaging with the additional driving gear to be rotated to cause the locking member to release the disc pack from lockup thereby on the disc pack receiving table when the additional gear moving arm is rotated in the third direction, and a second follower gear for engaging with the additional driving gear to be rotated to cause the driving lever to actuate the disc setting member when the additional gear moving arm is rotated in the fourth direction.

In the disc player thus constituted in accordance with the present invention, a disc loading operation and a disc unloading operation are carried out as follows.

On the occasion of the disc loading operation, first, the movable chassis is moved up to a position appropriate for taking a selected disc out of the disc pack. Then, the driving motor is energized to rotate in, for example, the clockwise direction and the driving roller is rotated with the rotatory driving force produced by the driving motor rotating in the clockwise direction in the manner for carrying a disc from the disc pack to the disc rotating device. Further, at the same time, the gear moving arm is rotated in the first direction to cause the driving gear to engage with the gear with teeth lacking partially and therefore the gear with teeth lacking partially is rotated by the first predetermined rotatory angle in one direction to drive the sliding lever in the manner for taking a disc out of the disc pack. Consequently, the sliding member in the disc pack is actuated by the sliding lever to send out the selected disc from the disc pack, and the selected disc taken out from the disc pack is carried by the driving roller to the disc rotating device to be loaded thereon.

While, on the occasion of a disc unloading operation, first, the movable chassis is moved up to a position appropriate for putting the disc removed from the disc rotating device back in the disc pack. Then, the driving motor is energized to rotate in, for example, the counterclockwise direction and the driving roller is rotated with the rotatory driving force produced by the driving motor rotating in the counterclockwise direction in the manner for carrying a disc from the disc rotating device to the disc pack. Further, at the same time, the gear moving arm is rotated in the second direction to cause the driving gear to engage with the gear with teeth lacking partially and therefore the gear with teeth lacking partially is rotated by the second predetermined rotatory angle in the other direction to drive the sliding lever so as to return to the original position thereof. Consequently, the disc removed from the disc rotating device is carried by the driving roller to be inserted in the disc pack.

As described above, in the disc player according to the present invention, with a relatively simple configuration using a single motor, each selected disc can be surely taken out from the disc pack through the sliding member actuated by the sliding lever and then expeditiously carried to the disc rotating device to be loaded thereon by the driving roller, and a disc removed from the disc rotating device can be surely put back in the disc pack.

Such a disc player according to the present invention can be not only simplified in configuration but also miniaturized in size and lightened in weight in comparison with the disc player in which each of the sliding lever and the driving roller is driven by the individual motor. In addition, the cost of manufacturing of the disc player according to the present invention can be reasonably reduced.

Further, in the embodiment of disc player according to the present invention constituted as aforementioned, when additional motor is energized to rotate in, for example, the clockwise direction, the additional gear moving arm is rotated in the third direction to cause the additional driving gear to engage with the first follower gear and therefore the first follower gear is rotated to drive the locking member to release the disc pack from locking up on the disc pack receiving table. On the other hand, when additional motor is energized to rotate in, for example, the counterclockwise direction, the additional gear moving arm is rotated in the fourth direction to cause the additional driving gear to engage with the second follower gear and therefore the second follower gear is rotated to drive the driving lever to actuate the sliding member, so that the disc inserted in the disc pack is placed at a proper position therein.

Accordingly, with a relatively simple mechanism using a single additional motor, the disc pack which is locked on the disc pack receiving table during the disc loading operation, the disc unloading operation and the information signal reproducing operation can be easily released from locking up and the disc which is inserted in the disc pack can be surely placed at a proper position therein through the disc setting member actuated by the driving lever.

The above and other objects, features and advantages of the present invention will become apparent from the following detailed description which is to be read in conjunction with the accompanying drawings.

DESCRIPTION OF THE PREFERRED EMBODIMENT

Now, one embodiment of disc player fitted for automatic change of discs according to the invention will be described in detail with reference to the accompanying drawings hereinafter.

Figure 1:
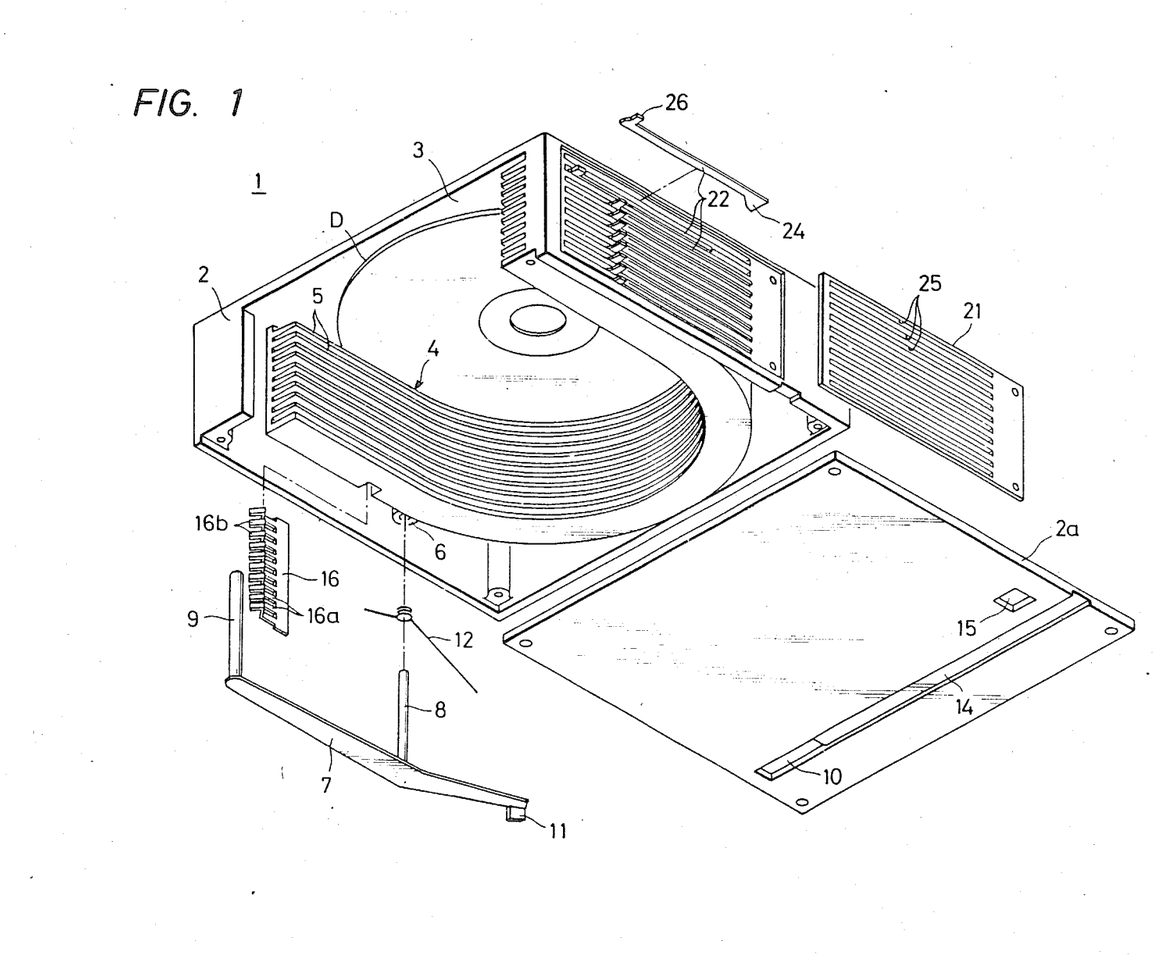
FIG. 1 is an exploded view in perspective showing an example of a disc pack used with a disc player fitted for automatic change of discs according to the present invention.
Figure 2:
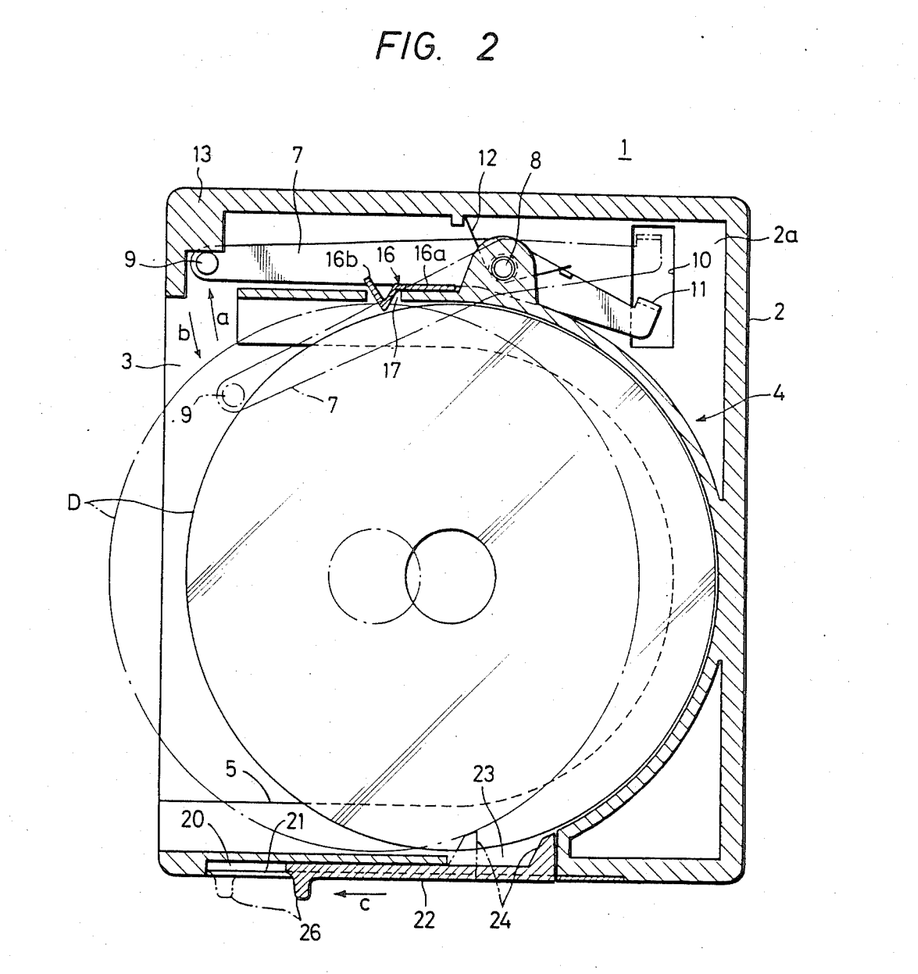
FIG. 2 is a sectional view of the disc pack shown in FIG. 1.

FIGS. 1 and 2 show a disc pack 1 which is to be attached to a disc player according to the present invention to supply selectively a plurality of discs for information signal reproduction.

This disc pack 1 has a case 2 provided on one of the side walls thereof with an opening 3 through which a disc D is inserted in the case 2 and taken out from the case 2 and also provided therein with a disc receiving portion 4. The disc receiving portion 4 has a plurality of U-shaped partition plates 5 for forming a plurality of disc receiving compartments arranged vertically. Each disc receiving compartment is positioned to hold the disc D inserted into the case 2.

On the outer side of the disc receiving portion 4, a bearing hole 6 is provided for receiving a shaft 8 of a disc setting lever 7. The disc setting lever 7 has a driving pin 9 standing at the one end thereof for pushing the circumferential side of the disc D supported by the U-shaped partition plate 5 to move the disc D into a proper position in the disc receiving compartment and an engaging tag 11 hanging at the other end thereof to project through an opening 10 provided on a bottom plate 2a of the case 2. This disc setting lever 7 is rotatable with a center at the shaft 8 and biased in the direction indicated with an arrow a in FIG. 2 by a spring 12, so that the driving pin 9 is in contact with a stopper 13 provided on the inner side of the case 2. The bottom plate 2a of the case 2 is provided also with a groove 14 elongating from the opening 10 to one side of thereof and a hollow 15 on the under surface thereof.

To the disc receiving portion 4, a comblike leaf spring 16 which is operative to prevent the disc D in the disc receiving compartment from being moved undesirably by shock or vibration inflicted to the case 2, is attached. The comblike leaf spring 16 is provided with a plurality of teeth 16a each having a bent end 16b projecting through a cutout 17 (shown in FIG. 2) fromed on the disc receiving portion 4 to be placed between each two adjacent U-shaped partition plates 5 to engage with the circumferential side of the disc D in the disc receiving compartment.

On a side of the case 2 different from the side on which the opening 3 is provided, a plurality of guide grooves 20 (indicated in FIG. 2) are provided and each of a plurality of sliding members 22 held by a supporting metal plate 21 is placed in each guide groove 20 to be movable in the direction along the surface of the disc D in the disc receiving compartment. The sliding member 22 has a pushing projection 24 projecting from one end thereof through a slit 23 formed on the side of the case 2 to come into contact with the circumferential side of the disc D in the disc receiving compartment, as shown in FIG. 2, and an engaging projection 26 projecting from the other end thereof through a slit 25 formed in the supporting metal plate 21 to the outside of the case 2, as shown in FIG. 2.

With such a configuration as described above, when the disc D held by the U-shaped partition plate 5 is not placed at a proper position in the disc receiving portion 4, as shown with a dot-dash line in FIG. 2, the disc setting lever 7 is rotated in the direction indicated with an arrow b in FIG. 2 with the engaging tag 11 driven by a certain driving member, so that the driving pin 9 is moved from the position shown with a solid line to the position shown with a dot-dash line in FIG. 2 and pushs the circumferential side of the disc D the while. As a result of this, the disc D is moved to the position shown with a solid line in FIG. 2 to be placed at the proper position in the disc receiving portion 4.

On the other hand, when the disc D held by the U-shaped partition plate 5 is placed at the proper position in the disc receiving portion 4, the sliding member 22 is moved in the direction indicated with an arrow c in FIG. 2, so that the pushing projection 24 is moved from the position shown with a solid line to the position shown with a dot-dash line in FIG. 2 and pushs the circumferential side of the disc D in the disc receiving compartment the while. As a result of this, the disc D is moved into the position shown with the dot-dash line in FIG. 2 so as to make a portion thereof project to the outside of the case 2 and to be capable of being taken out of the case 2.

The disc setting lever 7 and the sliding members 22 are driven to be moved in such a manner as mentioned above by a disc changing mechanism employed in a disc player according to the present invention, to which the disc pack 1 is attached.

Figure 3:
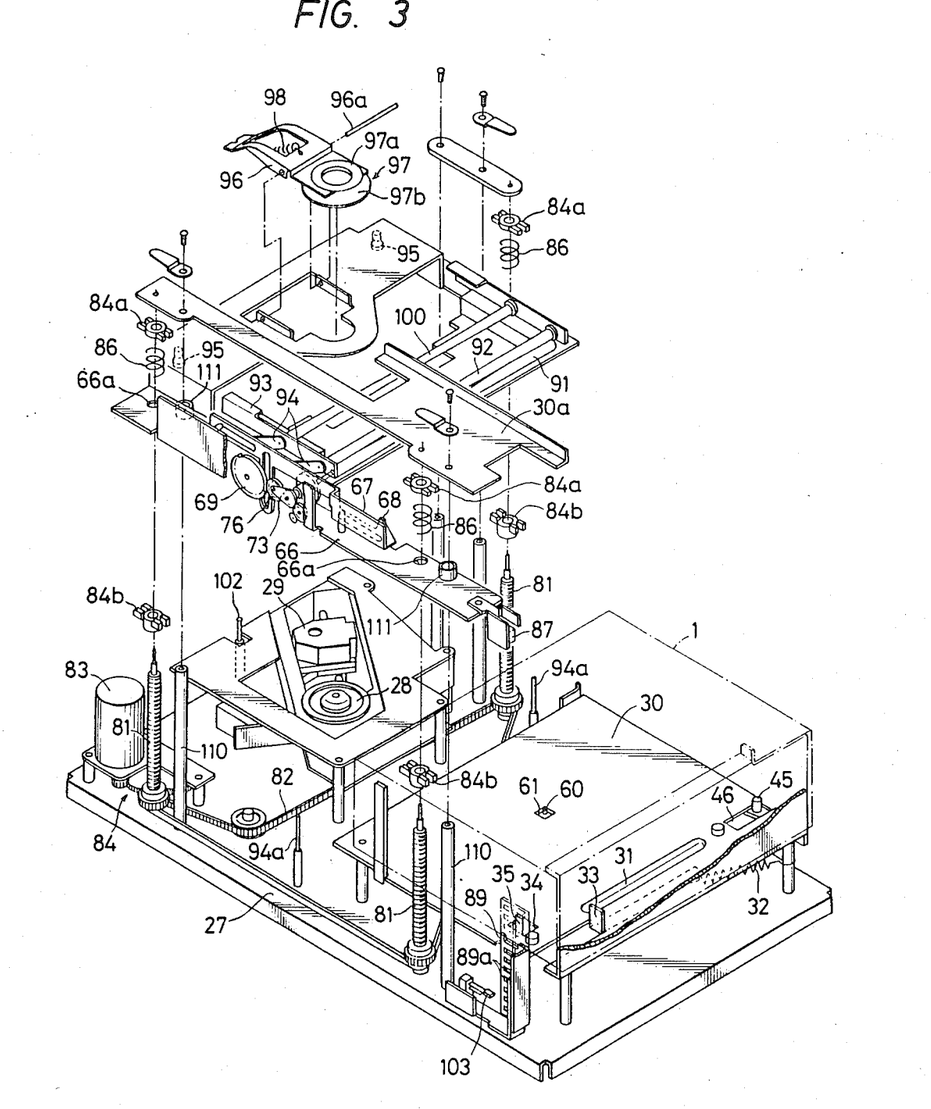
FIG. 3 is an exploded view in perspective showing one embodiment of disc player fitted for automatic change of discs according to the present invention.

FIG. 3 shows an essential portion of an embodiment of disc player fitted for automatic change of discs according to the present invention, which is equipped with the disc changing mechanism to which the disc pack 1 is attached.

This embodiment has a stationary chassis 27 on which a disc rotating device 28 driven to rotate by a spindle motor and an optical reading head device 29 for reading an information signal from the disc D loaded on the disc rotating device 28 and rotated thereby are mounted. Further, a disc pack receiving table 30 on which the disc pack 1 is loaded and which constitutes a part of the disc changing mechanism is also mounted on the stationary chassis 27. The disc pack receiving table 30 is provided with a guiding prominence 31 for engaging with the groove 14 of the disc pack 1 and a ejecting lever 33 biased with a spring 32.

On the occasion of the loading of the disc pack 1 on the disc pack receiving table 30, the disc pack 1 is put on the disc pack receiving table 30 so that the groove 14 is engaged with the guiding prominence 31 and the side wall thereof is in contact with the ejecting lever 33, and then slided on the disc pack receiving table 30 to move the ejecting lever 33 against the elastic force by the spring 32. When the disc pack 1 is moved into a predetermined locking position on the disc pack receiving table 30, a locking member 35 which is provided for projecting from the under side of the disc pack receiving table 30 through an opening 34 formed on the disc pack receiving table 30 comes to engage with the hollow 15 of the disc pack 1, so that the disc pack 1 is locked up by the locking member 35 on the disc pack receiving table 30. In this condition, the disc pack 1 is prevented from moving upwardly by a limiting plate 30a.

On the under side of the disc pack receiving table 30, a lock releasing mechanism for releasing the disc pack 1 from locking up by the locking member 35 and allowing the disc pack 1 to be ejected from the disc pack receiving table 30 and a driving mechanism for driving the disc setting lever 7 are mounted. Hereinafter, these lock releasing mechanism and driving mechanism will be detailed with reference to FIGS. 4 and 5.

Figure 4:
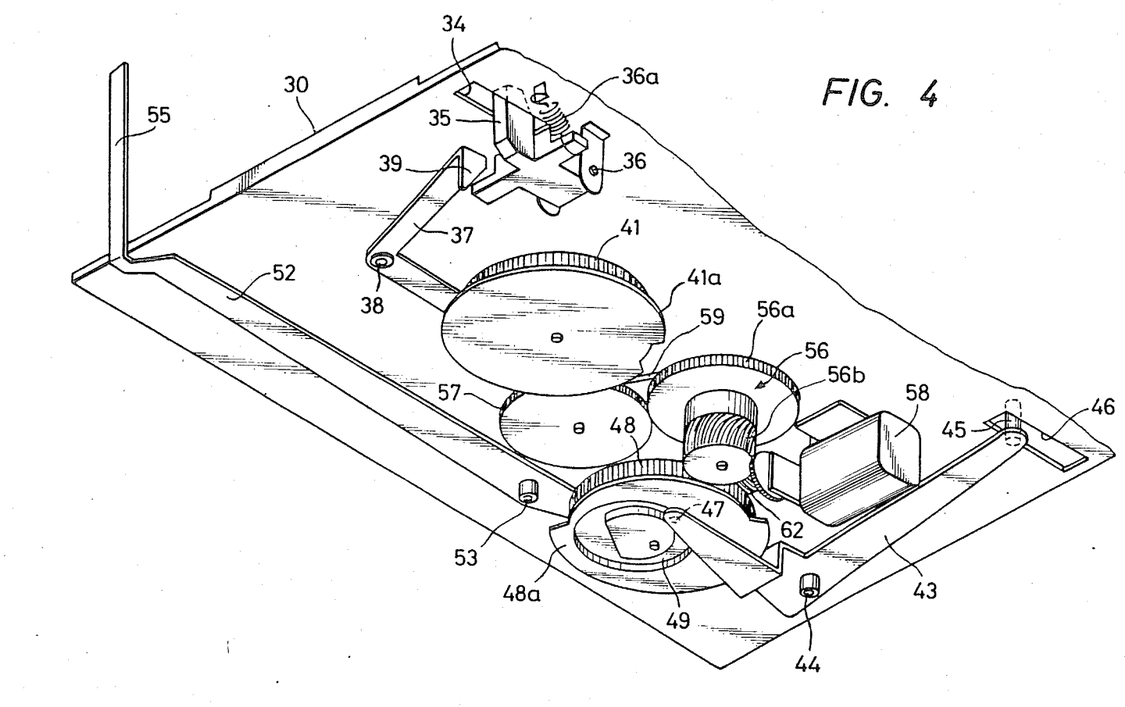
FIG. 4 is a perspective view showing the under side of a disc pack receiving table employed in the embodiment shown in FIG. 3.
Figure 5:
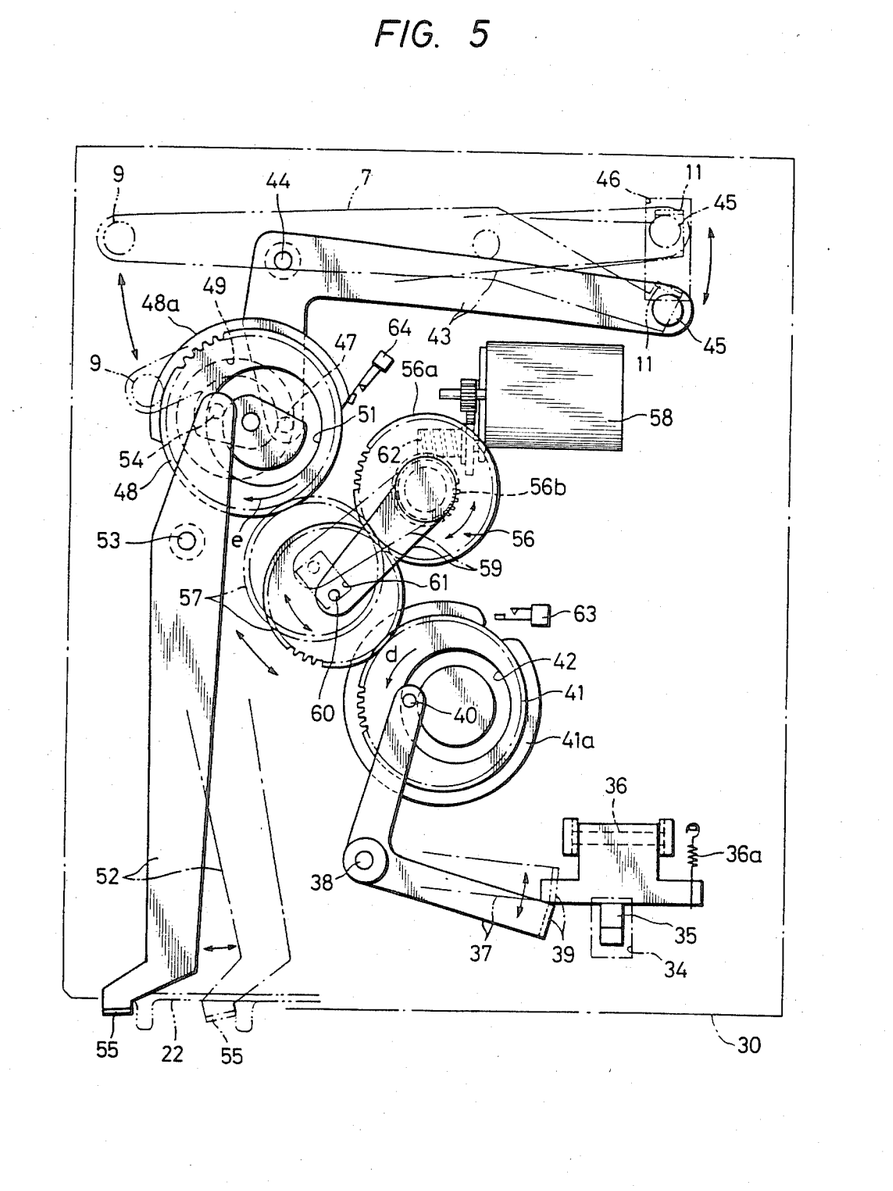
FIG. 5 is a plane view showing various parts provided on the under side of a disc pack receiving table employed in the embodiment shown in FIG. 3 and seen through the disc pack receiving table.

In the lock releasing mechanism, a lock releasing lever 37 is pivoted on a pin 38 projecting from the disc pack receiving table 30 for rotating the locking member 35 which is supported to be rotatable by a shaft 36 and biased by a spring 36a on the under side of the disc pack receiving table 30 to project through the opening 34 to the upper side of the disc pack receiving table 30, as shown in FIG. 4. This lock releasing lever 37 has at one end thereof a tag 39 for engaging with the locking member 35 to rotate the same and at the other end thereof an engaging pin 40 engaging with a cam groove 42 formed on a gear 41 mounted to be rotatable on the under side of the disc pack receiving table 30, as shown in FIG. 5. The cam groove 42 is eccentric to the center of the gear 41, as shown in FIG. 5, and therefore the lock releasing lever 37 is rotated to move the tag 39 from the position shown with a solid line to the position shown with a dot-dash line in FIG. 5 when the gear 41 is rotated by a half turn in the direction indicated with an arrow d in FIG. 5. As a result of this, the locking member 35 is pushed down by the slant edge of the tag 39 to sink below the upper side of the disc pack receiving table 30. Accordingly, if such operation is carried out when the disc pack 1 is loaded on the disc pack receiving table 30, the disc pack 1 is released from locking up by the locking member 35 and pushed by the ejecting lever 33 to be ejected from the disc pack receiving table 30.

In the driving mechanism for driving the disc setting lever 7 of the disc pack 1, a driving lever 43 which has a driving pin 45 at one end thereof is pivoted on a pin 44 projecting downward from the disc pack receiving table 30 for rotating the disc setting lever 7. The driving pin 45 projects through an opening 46 provided on the disc pack receiving table 30 to the upper side of the disc pack receiving table 30 for engaging with the engaging tag 11 on the disc setting lever 7 of the disc pack 1 locked on the disc pack receiving table 30, as shown in FIG. 5. The driving lever 43 has also at the other end thereof an engaging pin 47 engaging with a cam groove 49 formed on a gear 48 mounted to be rotatable on the under side of the disc pack receiving table 30, as shown in FIG. 4. The cam groove 49 is also eccentric to the center of the gear 48, and therefore the driving lever 43 is rotated to move the driving pin 45 from the position shown with a solid line to the position shown with a dot-dash line in FIG. 5 when the gear 48 is rotated by a half turn in the direction indicated with an arrow e in FIG. 5. As a result of this, the disc setting lever 7 of the disc pack 1 locked on the disc pack receiving table 30 is rotated in the direction for moving the disc D into the proper position in the disc receiving portion 4.

The gear 48 is provided also with a cam groove 51 on the side opposite to the side on which the cam groove 49 is provided, as shown in FIG. 5. The cam groove 51 is engaged with an engaging pin 54 projecting from the one end of a setting lever 52 which is pivoted on a pin 53 projecting downward from the disc pack receiving table 30 for setting the sliding members 22 of the disc pack 1 at predetermined respective positions all at once. The setting lever 52 has a driving bar 55 elongating upward from the other end of the setting lever 52 through the side of the disc pack receiving table 30 to a position corresponding to the disc pack 1 locked on the disc pack receiving table 30 for engaging with each sliding member 22 of the disc pack 1, as shown in FIG. 4.

In this configuration composed of the gear 48 and the setting lever 52, when the gear 48 is rotated by a half turn in the direction indicated with the arrow e in FIG. 5, the setting lever 52 is rotated so as to move the driving bar 55 from the position shown with a solid line to the position shown with a dot-dash line in FIG. 5. As a result of this, the sliding members 22 of the disc pack 1 locked on the disc pack receiving table 30 are moved to be set at the positions shown with solid lines in FIG. 2 all at once.

The gears 41 and 48 are rotated through driving gears 56 and 57 by a single motor 58 in such a manner as described below.

The driving gear 56 is mounted to be rotate on the under side of the disc pack receiving table 30 and a gear moving arm 59 is supported to be rotatable through a frictional member (not shown in FIGS.) by the driving gear 56. A pin 60 is fixed at the end of the gear moving arm 59 to project from both sides of the latter and the driving gear 57 is supported to be rotatable by a portion of the pin 60 projecting from one side of the gear moving arm 59. Another portion of the pin 60 projecting rrom the other side of the gear moving arm 59 is placed in an opening 61 provided on the disc pack receiving table 30, as shown in FIGS. 3 and 5. The driving gear 57 engages with a large toothed wheel 56a of the driving gear 56 and a worm wheel 56b of the driving gear 56 engages with a worm gear 62 driven by the motor 58.

With the arrangement thus constituted, in the case where the driving gear 56 is rotated in the counter-clockwise direction in FIG. 5 by the motor 58 which rotates in, for example, the clockwise direction, the gear moving arm 59 engaging with the driving gear 56 through the frictional member is rotated in the counter-clockwise direction and stopped at a position shown with a solid line in FIG. 5 where the pin 60 placed in the opening 61 is prevented from moving. With this movement of the gear moving arm 59, the driving gear 57 engages with the gear 41 to rotate the same in the direction indicated with the arrow d in FIG. 5. In this case, the gear 41 is rotated by one turn because a flange 41a with a cutout which is fixed to the gear 41 turns a switch 63 on at the beginning of the rotation of the gear 41 and then turns the same off so as to cause the motor 58 to stop rotating when one turn of the gear 41 is completed. During one turn of the gear 41, the lock releasing lever 37 takes the position shown with the dot-dash line in FIG. 5 once and then returns to the position shown with the solid line in FIG. 5.

On the contrary, in the case where the driving gear 56 is rotated in the clockwise direction in FIG. 5 by the motor 58 which rotates in, for example, the counter-clockwise direction, the gear moving arm 59 is rotated in the clockwise direction and the driving gear 57 engages with the gear 48 to rotate the same in the direction indicated with the arrow e in FIG. 5. In this case also, the gear 48 is rotated by one turn because a flange 48a with a cutout which is fixed to the gear 48 turns a switch 64 on at the beginning of the rotation of the gear 48 and then turns the same off so as to cause the motor 58 to stop rotating when one turn of the gear 48 is completed. During one turn of the gear 48, the driving lever 43 and setting lever 52 take the respective positions shown with the dot-dash lines in FIG. 5 once and then return to the respective positions shown with the solid lines in FIG. 5.

Next, the driving mechanism for moving the sliding members 22 on the disc pack 1 locked on the disc pack receiving table 30 in order to take out the disc D therefrom will described in detail.

Figure 6:
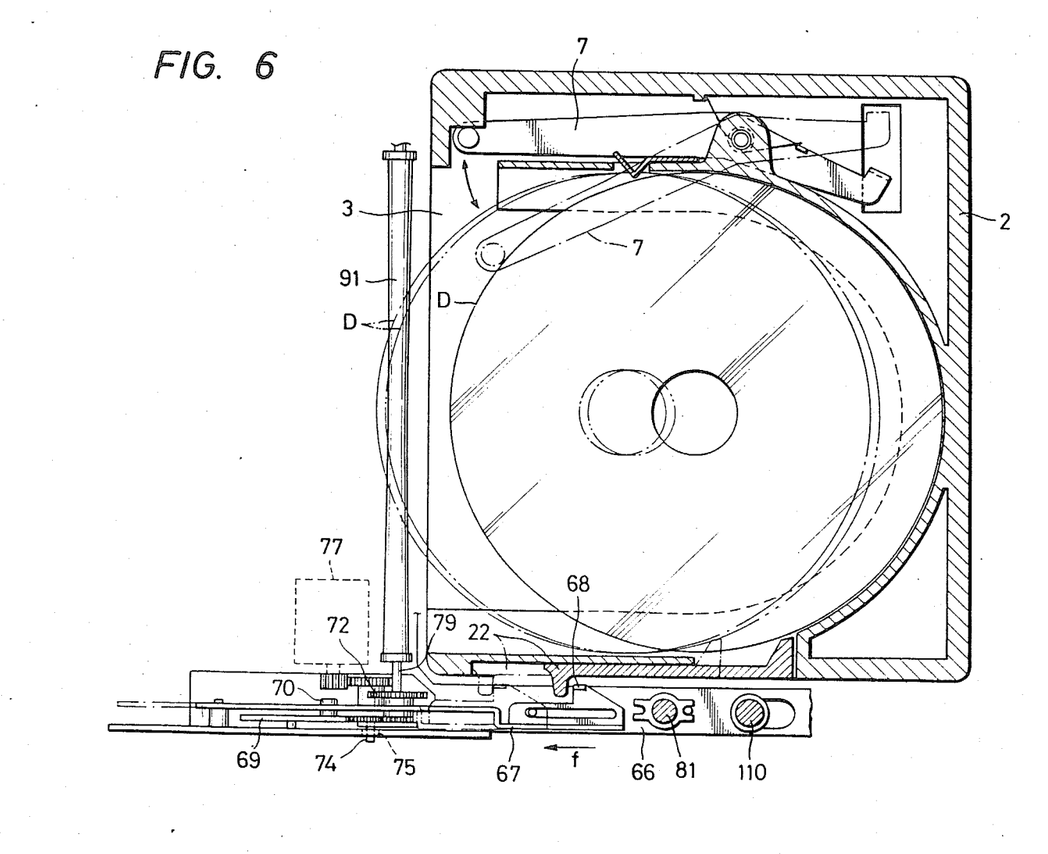
FIG. 6 is a plane view including a partial sectional view showing the positional relation between the disc pack shown in FIG. 1 and a sliding lever employed in the embodiment shown in FIG. 3.

As shown in FIGS. 3 and 6, a movable chassis 66, which constitutes the disc changing mechanism together with the disc pack receiving table 30, is provided on the stationary chassis 27 to be moved up and down in relation to the disc pack receiving table 30. On the movable chassis 66, a sliding lever 67 is provided for moving a selected one of the sliding members 22 in the disc pack 1 locked on the disc pack receiving table 30 to the side having the opening 3 of the case 2. The sliding lever 67 has a driving projection 68 for engaging with the engaging projection 26 of the sliding member 22 to drive the same and the driving projection 68 moves the sliding member 22 from the position shown with a solid line to the position shown with a dot-dash line in FIG. 6 when the sliding lever 67 is moved in the direction indicated with an arrow f in FIG. 6. With this movement of the sliding member 22, the disc D in the disc pack 1 is moved to the opening 3 provided on the case 2 as shown with a dot-dash line in FIG. 6.

Figure 7:
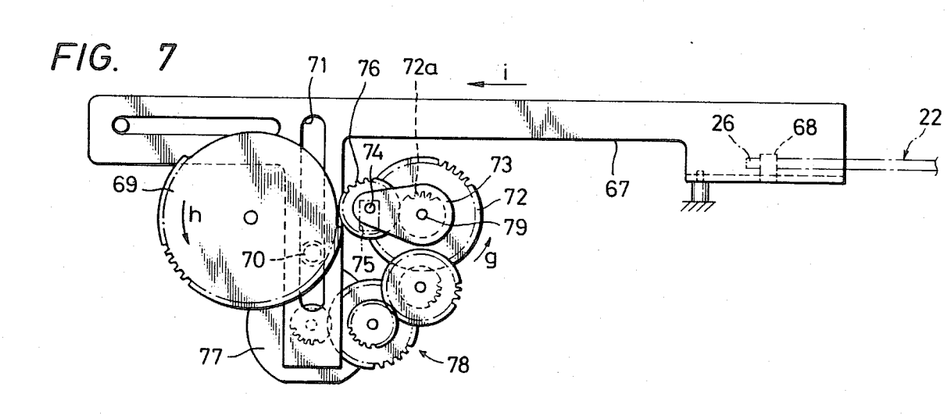
FIGS. 7 and 8 are schematic illustrations showing a mechanism for driving a sliding lever employed in the embodiment shown in FIG. 3.

The sliding lever 67 is driven by such a mechanism as undermentioned with reference to FIG. 7.

In the mechanism for driving the sliding lever 67, a gear 69 having teeth lacking partially is mounted to rotatable on a stand-up portion of the movable chassis 66. The gear 69 has a roller 70 projecting from a position thereon distant from the center thereof to be inserted in a slit 71 formed on the sliding lever 67 to elongate in the direction substantially perpendicular to the moving direction of the latter. A driving gear 72 is also mounted to be rotatable through a shaft 79 on the stand-up portion of the movable chassis 66, and a gear moving arm 73 is supported to be rotatable by the driving gear 72. A pin 74 is fixed at the end of the gear moving arm 73 to project from both sides of the latter and a driving gear 76 is supported to be rotatable by a portion of the pin 74 projecting from one side of the gear moving arm 73 to engage through a friction member (not shown in FIGS.) with the gear moving arm 73. Another portion of the pin 74 projecting from the other side of the gear moving arm 73 is placed in an opening 75 provided on the stand-up portion of the movable chassis 66. The driving gear 76 engages with a small toothed wheel 72a of the driving gear 72 and also with a toothed area of the gear 69.

On the under side of the movable chassis 66 a driving motor 77 is fixed. The rotatory driving force produced by the driving motor 77 is transmitted through a group of intermediate gears 78 to the driving gear 72. As shown in FIG. 6, the shaft 79 on which the driving gear 72 is fixed is elongated to serve as a shaft of a driving roller 91, and therefore the driving motor 77 is operative to drive both the sliding lever 67 and the driving roller 91.

Figure 8:
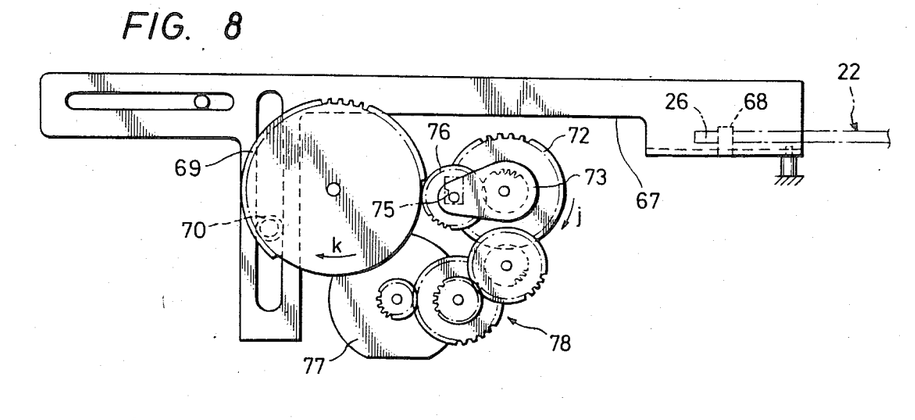

With the arrangement thus constituted, in the case where the driving gear 72 is rotated in the direction indicated with an arrow g in FIG. 7 by the driving motor 77 which rotates in, for example, the clockwise direction, the gear moving arm 73 engaging with the driving gear 76 through the frictional member is rotated also in the direction indicated with the arrow g and stopped at a position where the pin 74 placed in the opening 75 is prevented from moving, so as to slant downward as show in FIG. 8. With this movement of the gear moving arm 73, the driving gear 76 engages with the toothed area of the gear 69 to rotate the gear 69 in the direction indicated with an arrow h in FIG. 7. Then, the gear 69 is released from the engagement with the driving gear 76 at an area locking the teeth thereof, as shown in FIG. 8, and ceases rotating. During such rotation of the gear 69, the sliding lever 67 is driven by the roller 70 to shift in the direction indicated with an arrow i in FIG. 7, which is the same direction as the direction indicated with the arrow f in FIG. 6, thereby to move the sliding member 22 in the disc pack 1 locked on the disc pack receiving table 30.

In connection with this operation, the position of the roller 70 on the gear 69 is selected so that the sliding lever 67 is brought back by a small distance after moving the sliding member 22 into a desired position and consequently, the driving projection 68 is out of contact with the engaging projection 26 of the sliding member 22. The reason for this is that the sliding lever 67 is required to move up and down in relation to the disc pack receiving table 30 together with the movable chassis 66 without being disturbed by the sliding member 22.

After that, the driving gear 72 is rotated in the direction indicated with an arrow j in FIG. 8 by the driving motor 77 which rotates in, for example, the counterclockwise direction, the gear moving arm 73 is moved to return to such a position as shown in FIG. 7. During this movement of the gear moving arm 73, the driving gear 76 engages with the toothed area of the gear 69 to rotate the gear 69 in the direction indicated with an arrow k in FIG. 8, and thereafter the gear 69 is released from the engagement with the driving gear 76 at the area lacking the teeth thereof, as shown in FIG. 7, and ceases rotating. With this rotation of the gear 69, the sliding lever 67 is driven by the roller 70 to be put back.

The driving motor 77 continues to rotate for causing the driving roller 91 to rotate after the sliding lever 67 has been put back and ceased moving.

In this embodiment, since the disc pack 1 is locked on the disc pack receiving table 30 which is fixed on the stationary chassis 27, it is required, for taking out a selected one of the discs D from the disc pack 1 locked on the disc pack receiving table 30, that the sliding lever 67 is shifted to a position corresponding to each selected disc D contained in the disc pack 1, and such required shifts in position of the sliding lever 67 are carried out by moving the movable chassis 66 in its entirety up and down in relation to the disc pack receiving table 30. A mechanism for driving the movable chassis 66 to move the same up and down will be detailed hereinafter.

In the mechanism for moving the movable chassis 66 up and down, three driving screw guides 81 are made to stand to be rotatable on the stationary chassis 27, as shown in FIG. 3. These driving screw guides 81 are coupled through a driving belt 82 with one another and one of them, which is located to close to a motor 83, is driven through a group of transmitting gears 84 by the motor 83. Accordingly, the driving screw guides 81 are rotated by the motor 83 all at once.

Figure 9:
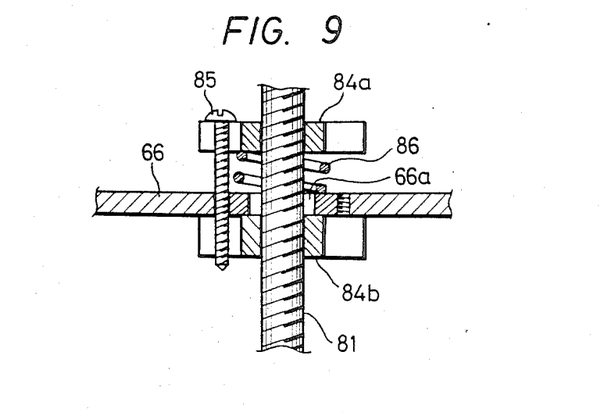
FIG. 9 is a sectional view used for explanation of the operatioh of a driving screw guide employed in the embodiment shown in FIG. 3.

As shown in FIG. 9, each driving screw guide 81 is engaged with a pair of tapped members 84a and 84b which are fixed on the movable chassis 66 by a screw 85. The movable chassis 66 is put on the tapped member 84i b with a opening 66a in which the driving screw guide 81 is inserted and a coil spring 86 is provided between the movable chassis 66 and the tapped member 84a for biasing the movable chassis 66 toward the tapped member 84b. The opening 66a is selected to have its diameter larger enough than the diameter of the driving screw guide 81.

Further, a plururity of guiding posts 110 are also made to stand on the stationary chassis 27 and the movable chassis 66 is provided with bearings 111 in which the guiding posts 110 are inserted, respectively, as shown in FIG. 3.

In the arrangement thus constituted, the tapped members 84a and 84b are moved along the driving screw guides 81 together with the movable chassis 66 when the driving screw guides 81 are rotated by the motor 83. With the movement of the movable chassis 66 along the driving screw guides 81, the sliding lever 67 mounted on the movable chassis 66 is moved up and down in relation to the disc pack receiving table 30 and shifted to the position corresponding to the selected disc D contained in the disc pack 1 locked on the disc pack receiving table 30. During this movement of the sliding lever 67, the position of the sliding lever 67 is detected by, for example, an optical position sensor 87 attached to the movable chassis 66 and the sliding lever 67 is controlled to be shifted surely to the desired position in accordance with the output on the optical position sensor 87. In this embodiment, the optical position sensor 87 is operative to read a plurality of slits 89a provided on a scale plate 89 fixed on the stationary chassis 27 to elongate along one of the guiding posts 110.

Figure 12:
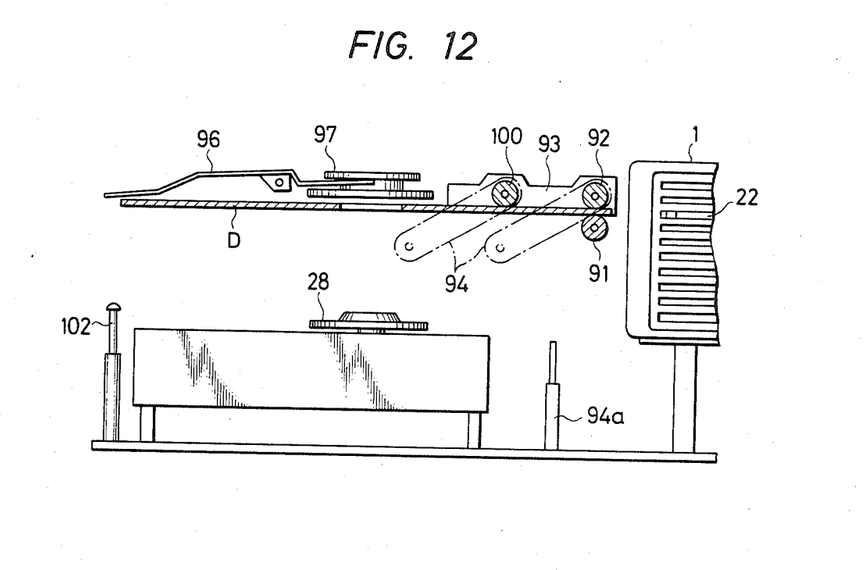
FIGS. 12 and 13 are schematic illustrations used for explanation of a disc loading operation and a disc unloading operation in the embodiment shown in FIG. 3.
Figure 13:
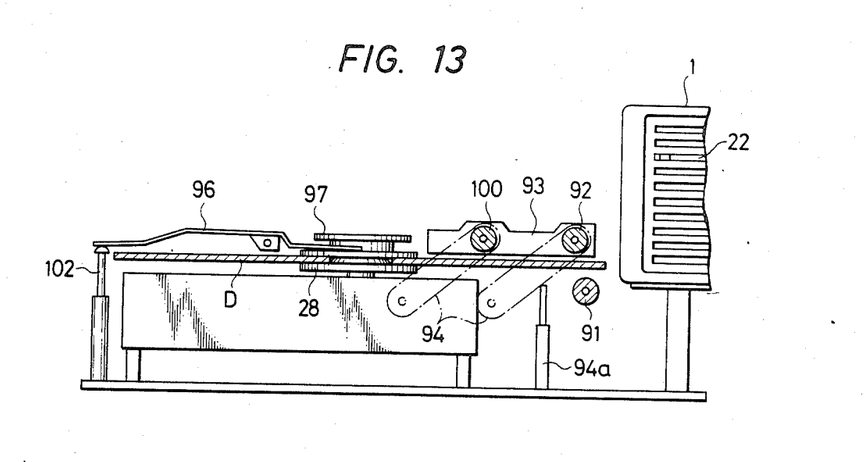

An idling roller 92 which is driven by the driving roller 91 is supported to be rotatable by a pair of supporting plates 93 mounted on the movable chassis 66, as shown in FIGS. 3, 12 and 13, so that the disc D taken out from the disc pack 1 is put between the driving roller 91 and the idling roller 92. A guiding roller 100 is also supported to be rotatable by the supporting plates 93. Each supporting plate 93 is connected through a link member 94 with the movable chassis 66 and biased downward by a spring (not shown is FIGS.) so that the idling roller 92 is caused to be in contact with the driving roller 91. Further, a pair of stoppers 94a are made to stand on the stationary chassis 27 for engaging with the link members 94, respectively, when the movable chassis 66 has moved down to a predetermined position.

With such an arrangement, the disc D, which has been taken out from the disc pack 1 by the sliding member 22 moved by the sliding lever 67 after the sliding lever 67 was shifted to the desirted position, is put between the driving roller 91 and the idling roller 92 and carried through the guiding roller 100 to the disc rotating device 28 by a combination of the driving roller 91 and the idling roller 92. When the disc D has been carried to a sosition above the disc rotating device 28, a pair of limiting pins 95 standing on the movable chassis 66 as shown in FIG. 3 engage with the circumferential side of the disc D to limit a further movement of the same. Each limiting pin 95 has under and upper portions with relatively large and small diameters, respectively.

Figure 10:
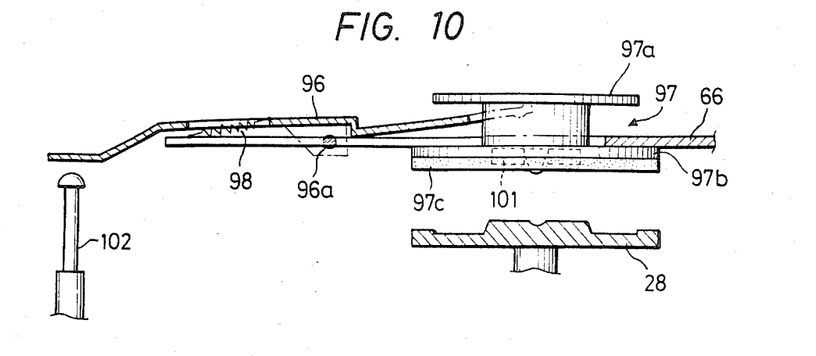
FIGS. 10 and 11 are schematic illustrations used for explanation of the operation of a clamping arm and a clamping device employed in the embodiment shown in FIG. 3.

Further, a clamping arm member 96 is mounted to be rotatable through a shaft 96a on the movable chassis 66 so as to support at one end thereof a clamping device 97 for clamping magnetically the disc D on the disc rotating device 28. The clamping device 97 has a upper flange portion 97a which is placed above the movable chassis 66 and an under flange portion 97b which is provided with a rubber ring 97c and a magnet 101 and placed below the movable chassis 66, as shown clearly in FIG. 10. The other end of the clamping arm member 96 is positioned to face to a stopper 102 standing on the stationary chassis 27. The clamping arm member 96 is biased to rotate around the shaft 96a in the counter-clockwise direction in FIG. 10 by a spring 98 and operative to lift up the upper flange portion 97a of the clamping device 97. Accordingly, the clamping device 97 is normally positioned above the disc rotating device 28 with the under flange portion 97b being in contact with the under side of the movable chassis 66, as shown in FIG. 10.

Figure 11:
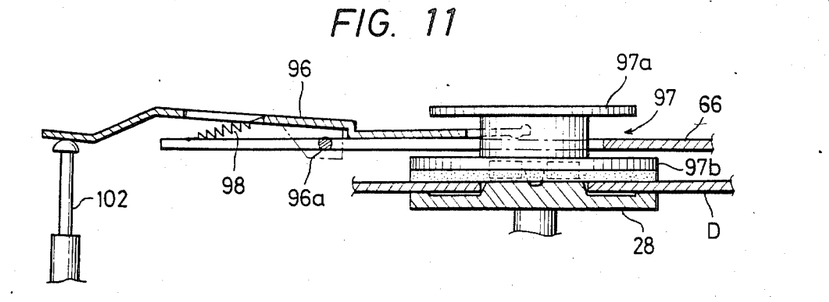

With the arrangement thus constituted, when the movable chassis 66 is moved down together with the disc D after the disc D has been carried to the position above the disc rotating device 28 by the combination of the driving roller 91 and the idling roller 92, the other end of the clamping arm member 96 comes into contact with the top of the stopper 102, as shown in FIG. 11, and therefore the clamping arm member 96 is rotated around the shaft 96a to remove from the upper flange portion 97a of the clamping device 97 and simultaneously to allow the under flange portion 97b of the clamping device 97 to clamp the disc D on the disc rotating device 28. In this condition, the clamping device 97 is kept to be out of contact with both the clamping arm member 96 and the movable chassis 66 and able to be rotated freely with the disc D on the disc rotating device 28.

Now, the operation for disc loading and unloading performed in the embodiment constituted as aforementioned will be described hereinafter.

On the occassion of the disc loading operation, whenever the disc pack 1 containing a plurality of discs D is loaded to be locked on the disc pack receiving table 30, both the driving lever 43 and the setting lever 52 are moved to rotate with the rotatory driving force produced by the motor 58. With the respective movements of the driving lever 43 and the setting lever 52, the disc setting lever 7 in the disc pack 1 is actuated to place each disc D contained in the disc pack 1 into the individual proper position in the disc receiving portion 4 therein and each sliding member 22 in the disc pack 1 is set to be placed in the individual inoperative position.

After that, when one of the discs D contained in the disc pack 1 is selected, the motor 83 is energized to rotate and the movable chassis 66 is moved up or down in relation to the disc pack receiving table 30 to place the sliding lever 67 at the position of a specific sliding member 22 corresponding to the selected disc D. Then, the driving motor 77 is energized to rotate and therefore the sliding lever 67 is actuated to shift the specific sliding member 22 so that the selected disc D is partially taken out from the disc pack 1 through the opening 3 provided on the case 2 by the shifted sliding member 22. The disc D partially taken out form the disc pack 1 is put between the driving roller 91 and the idling roller 92 and driven by the combination of the driving roller 91 and the idling roller 92 to be fully taken out from the disc pack 1 and then moved into a position corresponding to the disc rotating device 28, as shown in FIG. 12. At the end of this movement, the disc D comes into contact with the end of the clamping arm member 96 so as to be prevented from slanting to the disc rotating device 28.

When the disc D thus moved comes into contact with the under portion of the limiting pins 95 at the circumferential side thereof, an optical sensor (not shown in FIGS.) detects that the disc D has been placed at the position corresponding to the disc rotating device 28 and the movable chassis 66 is moved down in accordance with the output of the optical sensor. With this movement of the movable chassis 66, the disc D is also moved down toward the disc rotating device 28 and put on the same. The movable chassis 66 is moved down continuously after the disc D has been put on the disc rotating device 28.

When the movable chassis 66 is moved down to a position where the disc D is put on the disc rotating device 28, the link members 94 connecting the supporting plates 93 with the movable chassis 66 come into contact with the tops of the stoppers 94a, respectively, as shown in FIG. 13. Since the movable chassis 66 is moved down continuously with the link members 94 which are in contact with the tops of the stoppers 94a, the driving roller 91, the idling roller 92, the guiding roller 100 and so on are removed from the disc D on the disc rotating device 28. In concurrence with this, the clamping arm member 96 is rotated around the shaft 96a by the stopper 102 with which the end of the clamping arm member 96 comes into contact, so that the clamping device 97 clamps the disc D on the disc rotating device 28.

After that, the movable chassis 66 comes into contact with a leaf switch 103 (shown in FIG. 3) to turn the same off, so that the motor 83 is ceased to rotate and therefore the movable chassis 66 stops moving down, and the disc D is ready for information signal reading by the optical reading head device 29. In such a condition, the circumferential side of the disc D is out of contact with the under portion of the limiting pins 95 and faces to the upper portion of the limiting pins 95, which has its diameter smaller than that of the under portion. Accordingly, the disc D is able to be rotated without contacting with the limiting pins 95.

On the occasion of the disc unloading operation, the motor 83 is energized to rotate so that the movable chassis 66 is moved up. With this movement of the movable chassis 66, the disc D is removed from the disc rotating device 28 to be put between the driving roller 91 and the idling roller 92 and moved up together with the movable chassis 66. When the disc D has been moved into a position corresponding to one of the disc receiving compartments in the disc pack 1 in which the disc D is to be put back, the movable chassis 66 is ceased to move up.

In this connection, although an electronic memory on which data representing the disc receiving compartment in which the disc D is to be put back are memorized is provided and the date read from the electronic memory is utilized to control the movement of the movable chassis 66, it is feared that such data as memorized on the electronic memory are destroyed due to, for example, stoppage of electric power. Accordingly, in this embodiment, there is provided such an arrangement that the disc receiving compartment in which the disc D is to be put back can be obtained by detecting the position of a sliding member 22 in the disc pack 1 which is shifted to the opening 3 provided on the case 2 when the data memorized on the electronic memory have been destroyed.

After the disc D has been placed at the position corresponding to the disc receiving compartment in which the disc D is to be put back, the driving motor 77 is energized to rotate so as to put the sliding lever 67 back and simultaneously to drive the driving roller 91 so that the disc D is driven by the combination of the driving roller 91 and the idling roller 92 to be move into the position as shown with a dual-dot-dash line in FIG. 6.

When the disc D has been placed at such a position, this is detected by an optical sensor (not shown in FIGS.) and the motor 58 is energized to rotate in accordance with the output of the optical sensor. With the rotatory driving force produced by the motor 58, both the driving lever 43 and the setting lever 52 are rotated, so that the disc D is moved into the proper position in the disc receiving portion 4 in the disc pack 1 as shown with the solid line in FIG. 6 and simultaneously the sliding member 22 corresponding to the disc D moved into the proper position is put back to the inoperative position thereof.

After that, finally, the driving motor 77 is ceased to rotate.

What is claimed is:

1. A disc player fitted for automatic change of discs, comprising: disc pack receiving means for receiving and holding stationary a disc pack containing a plurality of discs and having a sliding member for sending out a disc from the disc pack and a disc setting member for moving a disc inserted in the disc pack to a proper position therein, disc rotating means for rotating a disc taken out from the disc pack and loaded thereon, and movable supporting means operative to move up and down in relation to said disc pack receiving means and provided thereon with mechanical means comprising a sliding lever for actuating the sliding member to take a selected disc out of the disc pack, a driving motor for rotating selectively in the clockwise and counterclockwise directions, a driving roller for being rotated with the rotatory driving force produced by said driving motor to carry the selected disc taken out from the disc pack to said disc rotating means, a gear moving arm for being rotated with the rotatory driving force produced by said driving motor in one of first and second directions in accordance with the rotational direction of said driving motor, a driving gear supported by said gear moving arm to be rotated with the rotatory driving force produced by said driving motor, and a gear with teeth lacking partially for engaging with said driving gear to be rotated by a first predetermined rotatory angle in one direction to drive said sliding lever in the manner for taking a disc out of the disc pack when said gear moving arm is rotated in the first direction and also engaging with said driving gear to be rotated by a second predetermined rotatory angle in the other direction to drive said sliding lever so as to put back the same when said gear moving arm is rotated in the second direction, and wherein said disc pack receiving means is provided with an additional mechanical arrangement comprising a locking member for locking the disc pack on said disc pack receiving means, a driving lever for actuating the disc setting member in the disc pack, an additional motor for rotating selectively in first and second rotational directions opposite to each other, and a driving mechanism for causing said locking member to release the disc pack from lockup thereby on said disc pack receiving means when said additional motor rotates in the first rotational direction and for causing said driving lever to actuate the disc setting member when said additional motor rotates in the second rotational direction.

2. A disc player according to claim 1, wherein said sliding lever is provided with an engaging portion projecting in the direction substantially perpendicular to the moving direction of said sliding lever and said gear with teeth lacking partially is provided at a position distant from the center thereof with a projection for engaging with said engaging portion of said sliding lever.

3. A disc player according to claim 2, wherein said engaging portion of said sliding lever comprises a slit and said projeotion of said gear comprises a roller for engaging with said slit.

4. A disc player according to claim 1, wherein said mechanical means further comprises lever position control means for putting back said sliding lever by a small distance after said sliding lever has been driven in the manner for taking a disc out of the disc pack.

5. A disc player according to claim 4, wherein said lever position control means comprises an engaging portion provided on said sliding lever and a projections provided on said gear with teeth lacking partially at a position distant from the center thereof for engaging with said engaging portion of said sliding lever.

6. A disc player according to claim 1, wherein said disc pack receiving means is provided with a setting lever for engaging with said sliding member in the disc pack to put the same back to an inoperative position and an additional motor for driving said setting lever.

7. A disc player according to claim 1, wherein said driving mechanism comprises an additional gear moving arm for being rotated with the rotatory driving force produced by said additional motor in one of the third and fourth direction in accordance with the rotational direction of said additional motor, an additional driving gear supported by said additional gear moving arm to be rotated with the rotatory driving force produced by said additional motor, a first follower gear for engaging with said additional driving gear to be rotated to cause said locking member to release the disc pack from lockup thereby on said disc pack receiving means when said additional gear moving arm is rotated in the third direction, and a second follower gear for engaging with said additional driving gear to be rotated to cause said driving lever to actuate the disc setting member when said additional gear moving arm is rotated in the fourth direction.

8. A disc player fitted for automatic change of discs, comprising: disc pack receiving means for receiving and holding stationary a disc pack containing a plurality of discs and having a sliding member for sending out a disc from the disc pack and a disc setting member for moving a disc inserted in the disc pack to a proper position therein, disc rotating means for rotating a disc taken out from the disc pack and loaded thereon, and movable supporting means operative to move up and down in relation to said disc pack receiving means and provided thereon with mechanical means comprising a sliding lever for actuating the sliding member to take a selected disc out of the disc pack, a driving motor for rotating selectively in the clockwise and counterclockwise directions a driving roller for being rotated with the rotatory driving force produced by said driving motor to carry the selected disc taken out from the disc pack to said rotating means, a gear moving arm for being rotated with the rotatory driving force produced by said driving motor in one of first and second directions in accordance with the rotational direction of said driving motor, a driving gear supported by said gear moving arm to be rotated with the rotatory driving force produced by said driving motor, and a gear with teeth lacking partially for engaging with said driving gear to be rotated by a first predetermined rotatory angle in one direction to drive said sliding lever in the manner for taking a disc out of the disc pack when said gear moving arm is rotated in the first direction and also engaging with said driving gear to be rotated by a second predetermined rotatory angle in the other direction to drive said sliding lever so as to put back the same when said gear moving arm is rotated in the second direction, wherein said disc pack receiving means is provided with a setting lever for engaging with said sliding member in the disc pack to put the same back to an inoperative position and an additional motor for driving said setting lever, and wherein said disc pack receiving means is further provided with a locking member for locking the disc pack on said disc pack receiving means and a driving mechanism for causing said locking member to release the disc pack from lockup thereby on said disc pack receiving means when said additional motor rotates in a first rotational direction and for causing said setting lever to engage with said sliding member when said additional motor rotates in a second rotational direction opposite to said first rotational direction.

* * * * *